United States Patent
Weston et al.

(10) Patent No.: US 10,387,464 B2
(45) Date of Patent: Aug. 20, 2019

(54) PREDICTING LABELS USING A DEEP-LEARNING MODEL

(71) Applicant: Facebook, Inc., Menlo Park, CA (US)

(72) Inventors: Jason E. Weston, New York, NY (US); Keith Adams, Palo Alto, CA (US); Sumit Chopra, Jersey City, NJ (US)

(73) Assignee: Facebook, Inc., Menlo Park, CA (US)

( * ) Notice: Subject to any disclaimer, the term of this patent is extended or adjusted under 35 U.S.C. 154(b) by 736 days.

(21) Appl. No.: 14/949,436

(22) Filed: Nov. 23, 2015

(65) Prior Publication Data

US 2017/0061294 A1 Mar. 2, 2017

Related U.S. Application Data

(60) Provisional application No. 62/209,881, filed on Aug. 25, 2015.

(51) Int. Cl.
*G06N 3/04* (2006.01)
*G06F 16/33* (2019.01)

(52) U.S. Cl.
CPC ........ *G06F 16/334* (2019.01); *G06F 16/3331* (2019.01); *G06N 3/0454* (2013.01)

(58) Field of Classification Search
USPC .......................................................... 706/12
See application file for complete search history.

(56) References Cited

U.S. PATENT DOCUMENTS

| 8,443,155 | B2* | 5/2013 | Adams | G06F 9/526 711/148 |
| 8,984,492 | B2* | 3/2015 | Adl-Tabatabai | G06F 9/4552 717/130 |
| 8,984,542 | B2* | 3/2015 | Adams | G06F 9/44521 719/332 |
| 9,069,807 | B2* | 6/2015 | Smith | G06F 9/34 |

(Continued)

OTHER PUBLICATIONS

Charagram: Embedding Words and Sentences via Character n-grams, JohnWieting Mohit Bansal Kevin Gimbel Karen Livescu Toyota Technological Institute, arXiv:1607.02789v1 [cs.CL] Jul. 10, 2016.*

(Continued)

*Primary Examiner* — Michael B Holmes
(74) *Attorney, Agent, or Firm* — Baker Botts L.L.P.

(57) ABSTRACT

In one embodiment, a method includes receiving text query that includes n-grams. A vector representation of each n-gram is determined using a deep-learning model. A non-linear combination of the vector representations of the n-grams is determined, and an embedding of the text query is determined based on the nonlinear combination. The embedding of the text query corresponds to a point in an embedding space, and the embedding space includes a plurality of points corresponding to a plurality of label embeddings. Each label embedding is based on a vector representation of a respective label determined using the deep-learning model. Label embeddings are identified as being relevant to the text query by applying a search algorithm to the embedding space. Points corresponding to (Continued)

the identified label embeddings are within a threshold distance of the point corresponding to the embedding of the text query in the embedding space.

17 Claims, 8 Drawing Sheets

(56) References Cited

U.S. PATENT DOCUMENTS

| | | | | |
|---|---|---|---|---|
| 9,092,425 | B2* | 7/2015 | Mirowski | G06F 17/28 |
| 9,098,299 | B2* | 8/2015 | Adams | G06F 8/437 |
| 9,311,348 | B2* | 4/2016 | Smith | G06F 9/34 |
| 9,396,007 | B2* | 7/2016 | Adams | G06F 9/45516 |
| 9,569,360 | B2* | 2/2017 | Vijayrao | G06F 12/084 |
| 9,697,022 | B2* | 7/2017 | Adams | G06F 8/437 |
| 9,858,484 | B2* | 1/2018 | Tran | G06K 9/00744 |
| 9,880,943 | B2* | 1/2018 | Adams | G06F 9/45516 |
| 10,198,433 | B2* | 2/2019 | Weston | G06F 3/0482 |
| 10,198,637 | B2* | 2/2019 | Tran | G06K 9/00744 |
| 2012/0082371 | A1* | 4/2012 | Bengio | G06K 9/6282 382/159 |
| 2012/0150532 | A1* | 6/2012 | Mirowski | G06F 17/28 704/9 |
| 2017/0061294 | A1* | 3/2017 | Weston | G06N 3/0454 |
| 2017/0193390 | A1* | 7/2017 | Weston | G06N 99/005 |
| 2017/0200077 | A1* | 7/2017 | Weston | G06N 3/063 |
| 2018/0137941 | A1* | 5/2018 | Chen | G06F 19/00 |
| 2018/0144264 | A1* | 5/2018 | Ranzato | G06F 17/2785 |

OTHER PUBLICATIONS

ACM (DL) Digital Library, Learning Deep Structured Semantic Models for Web Search using Clickthrough Data, Po-Sen Huang, Xiaodong He, Jianfeng Gao, Li Deng, Alex Acero, Larry Heck, CIKM '13 Proceedings of the 22nd ACM international conference on Information & Knowledge Management pp. 2333-2338 San Francisco, California, Oct.-Nov. 1, 2013.*

Review, Deep learning, Yann LeCun, Yoshua Bengio, & Geoffrey Hinton, Nature vol. 521, pp. 436-444 (May 28, 2015).*

Deep Learning-Based Document Modeling for Personality Detection from Text, Navonil Majumder, Instituto Politécnico Nacional Soujanya Poria, Nanyang Technological University Alexander Gelbukh, Instituto Politécnico Nacional Erik Cambria, Nanyang Technological University IEEE Intelligent Systems ( vol. 32, Issue: 2, Mar.-Apr. 2017) pp. 74-79.*

ACM Digital Library Learning deep structured semantic models for web search using clickthrough data, Po-Sen Huang, Xiaodong He, Jianfeng Gao, Li Deng, Alex Acero, Larry Heck CIKM '13 Proceedings of the 22nd ACM international conference on Information & Knowledge Management pp. 2333-2338 2013.*

ACM Digital Library Learning semantic representations using convolutional neural networks for web search, Yelong Shen, Xiaodong He, Jianfeng Gao, Li Deng, Grégoire Mesnil WWW '14 Companion Proceedings of the 23rd International Conference on World Wide Web pp. 373-374 2014.*

Cornell University Molding CNNs for text: non-linear, non-consecutive convolutions, Tao Lei, Regina Barzilay, and Tommi Jaakkola, (Submitted on Aug. 17, 2015 (v1), last revised Aug. 18, 2015 (this version, v2)) pp. 1-11 Computation and Language (cs.CL); Artificial Intelligence (cs.AI).*

Extractive Summarization using Continuous Vector Space Models Mikael Kageback, Olof Mogren, Nina Tahmasebi, Devdatt Dubhashi, Proceedings of the 2nd Workshop on Continuous Vector Space Models and their Compositionality (CVSC) @ EACL 2014, pp. 31-39, Gothenburg, Sweden, Apr. 26-30, 2014.*

* cited by examiner

PREDICTING LABELS USING A DEEP-LEARNING MODEL

PRIORITY

This application claims the benefit, under 35 U.S.C. § 119(e), of U.S. Provisional Patent Application No. 62/209,881, filed 25 Aug. 2015, which is incorporated herein by reference.

TECHNICAL FIELD

This disclosure generally relates to presentation of content on a computing device.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may use a deep-learning model to predict relevant labels for a text query. The deep-learning model may be trained to map text and labels to vector representations. The deep-learning model may be trained using labels as a supervised signal. Each of the vector representations may correspond to coordinates of a point in a multi-dimensional embedding space. An embedding of text or a label may be determined based on the vector representations, and the embedding may be a representation of the text or label in the embedding space. The text embeddings and label embeddings may be used to accomplish any number of suitable tasks. As an example and not by way of limitation, the social-networking system may employ a search algorithm to identify one or more labels embeddings proximate to a text query in the embedding space. The system may determine that the labels of the identified label embeddings are relevant to the text query.

In particular embodiments, the labels may be identified in response to a received text query inputted by the user at a client system. The identified labels may be displayed to the user as suggestions on an interface of an application running on the client system (e.g., a messaging platform or an application associated with a social-networking system). The user may select one or more labels from the set of identified labels, and the selected label may, as an example and not by way of limitation, be sent, with or without the text query, as a message to another user over the messaging platform or posted as a status update to a social-networking system.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
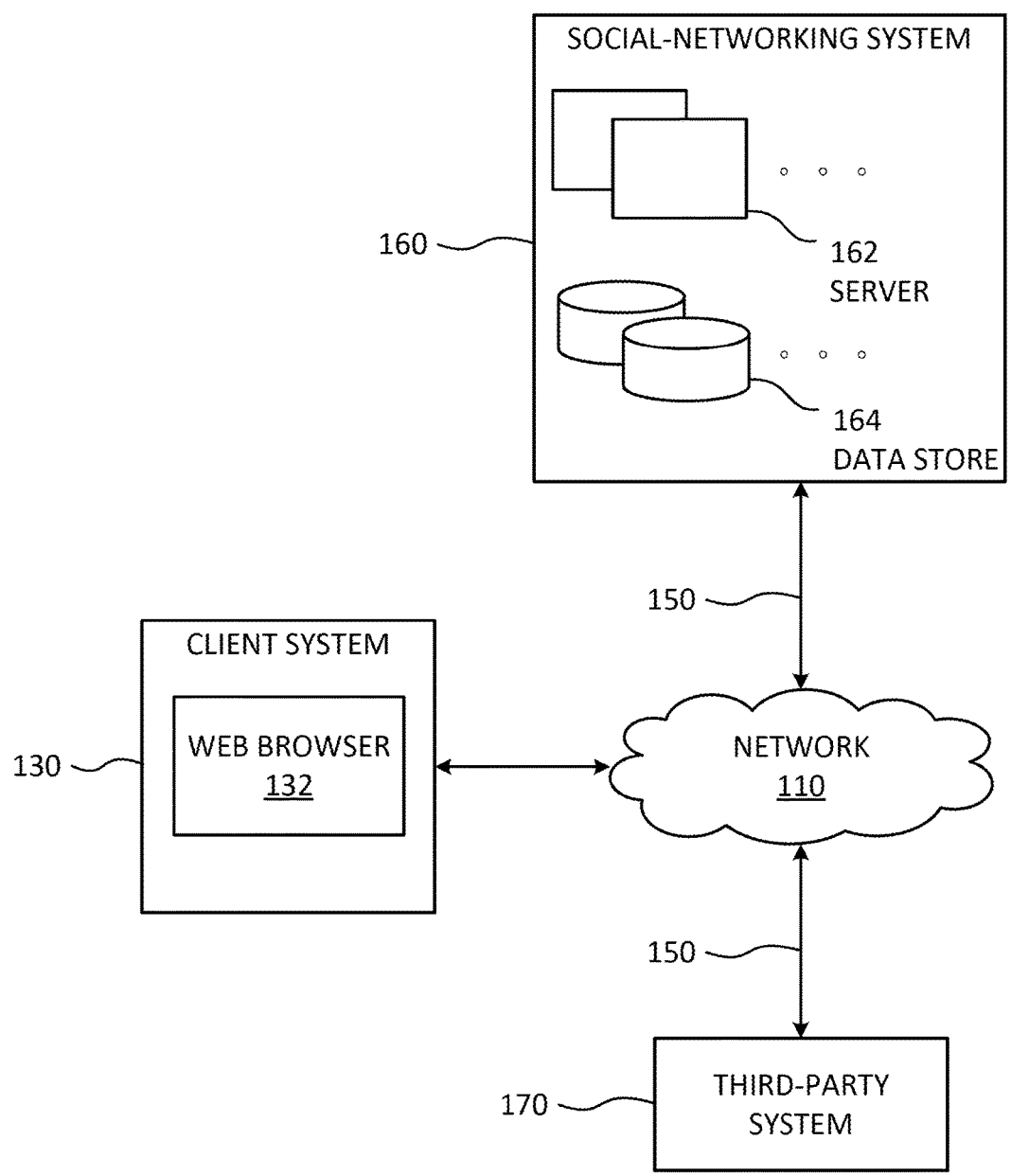
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
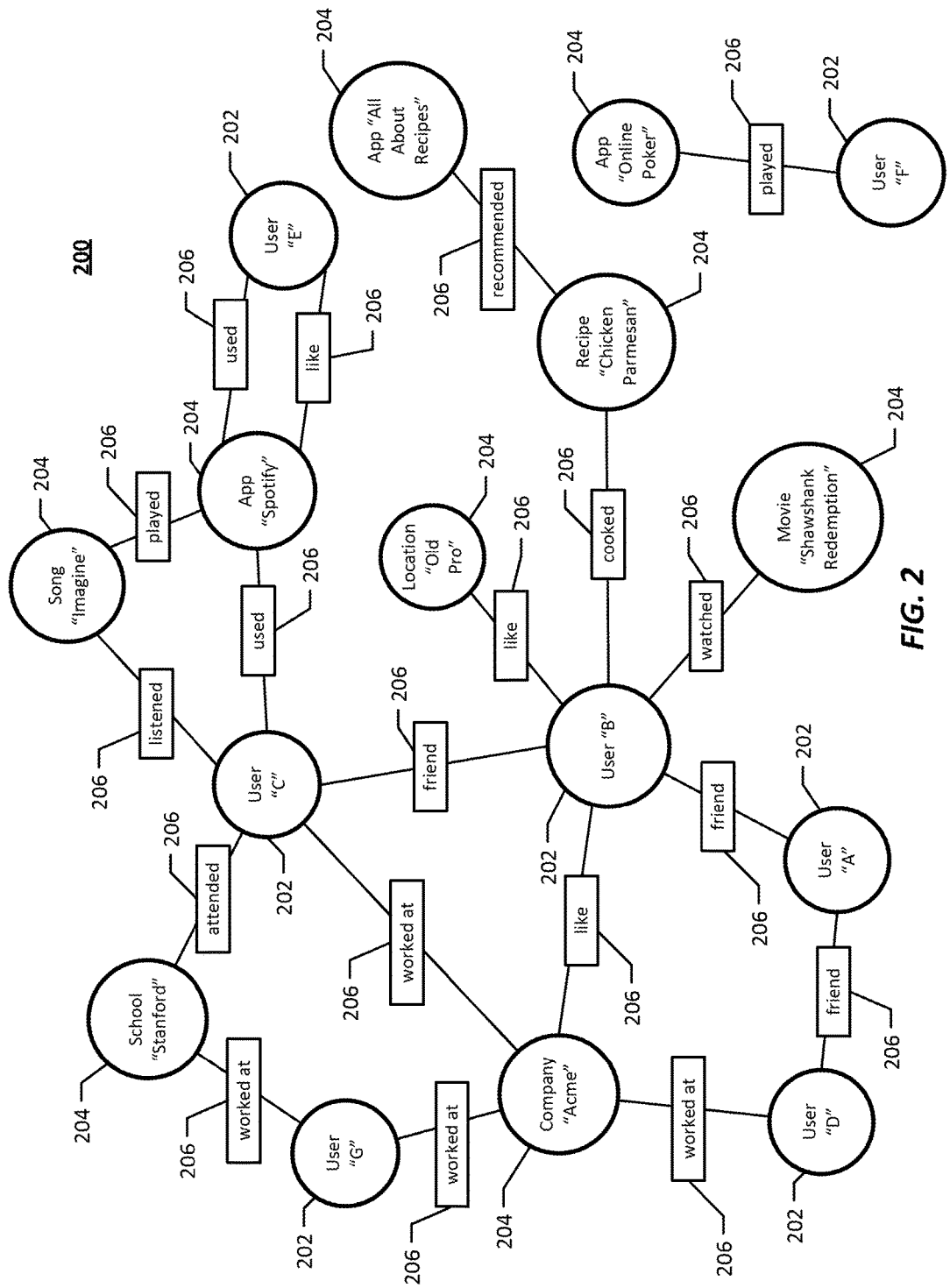
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Training a Deep-Learning Model

Particular embodiments identify one or more labels that are relevant to a given text query using a deep-learning model. Labels may include, as an example and not by way of limitation, hashtags, emoji, stickers, ideograms, any other suitable text annotations, any other suitable characters, symbols, or images, which each may represent an idea or thing with or without using letters or words, or any combination thereof. As used herein, hashtags may be single tokens made up of natural language n-grams or abbreviations, prefixed with the character "#" (e.g., #blessed). Hashtags may be used, for example, to disambiguate (chips #futurism vs. chips #junkfood); to identify named entities (#philadelphia-flyers); to express sentiment (#dislike); and for topic annotation (#yoga). A text query may be inputted by a user at an interface of an application running on a client system 130 (e.g., an application associated with social-networking system 160 or a messaging platform) or otherwise generated (e.g., received at social-networking system 160). A text query may be any text string made up of one or more n-grams. As used herein, n-grams may be words or groups of words, any part of speech, punctuation marks (e.g., "!"), colloquialisms (e.g., "go nuts"), acronyms (e.g., "BRB"), abbreviations (e.g., "mgmt."), exclamations ("ugh"), alphanumeric characters, symbols, written characters, accent marks, or any combination thereof.

In particular embodiments, the deep-learning model (e.g., a neural network) may include a first dictionary 300A trained to map text to vector representations. The deep-learning model may also include a second dictionary 300B trained to map labels to vector representations. Dictionaries 300A and 300B are described in connection with FIGS. 3A-3B.

Figure 3A:
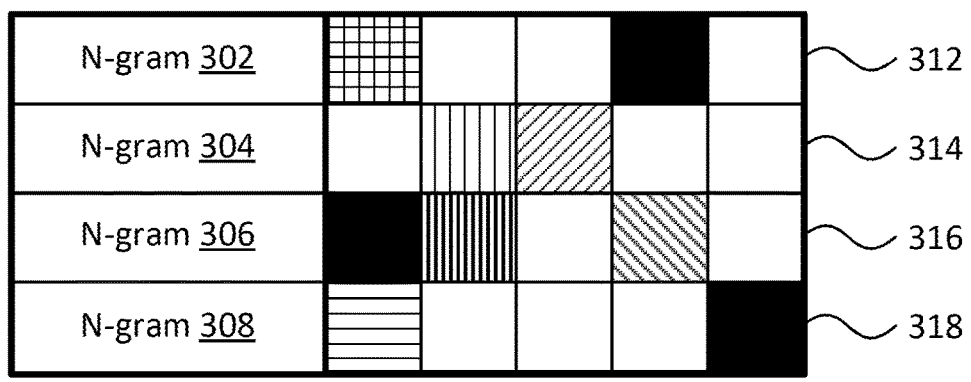
FIG. 3A illustrates an example dictionary mapping n-grams to vector representations.
Figure 3B:
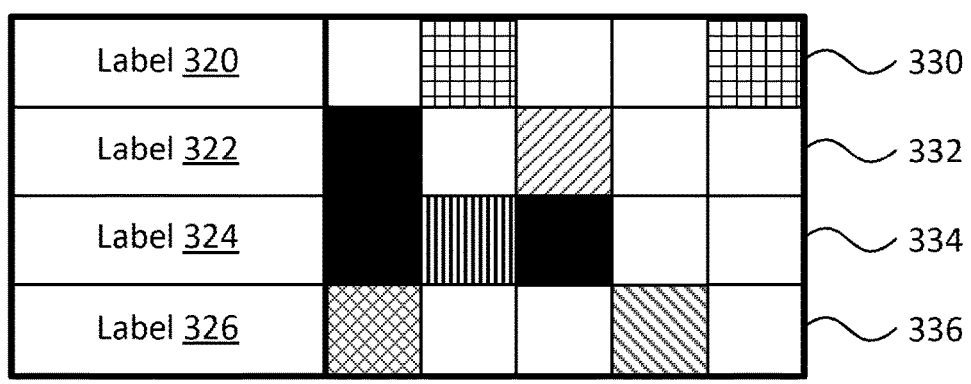
FIG. 3B illustrates an example dictionary mapping labels to vector representations.

FIG. 3A illustrates example first dictionary 300A mapping n-grams 302, 304, 306, and 308 to vector representations 312, 314, 316, and 318. FIG. 3B illustrates example second dictionary 300B mapping labels 320, 322, 324, and 326 to vector representations 330, 332, 334, and 336. In particular embodiments, first and second dictionaries 300A and 300B may be generated by social-networking system 160. In particular embodiments, first and second dictionaries 300A and 300B may map respective n-grams and labels to vectors in $\mathbb{R}^d$, where $\mathbb{R}$ denotes the set of real numbers and d is a hyper-parameter that controls capacity. Vector representations 312, 314, 316, 318, 330, 332, 334, and 336 may be d-dimensional intensity vectors. As used herein, intensity values may be any suitable values in the range of −1 to 1. For illustrative purposes and not by way of limitation, the intensity values in example vector representations 312, 314, 316, 318, 330, 332, 334, and 336 are depicted as patterns in FIGS. 3A-3B. For example, first dictionary 300A maps n-gram 302 to vector representation 312, which is illustrated as the top row of cells of various patterns, adjacent to n-gram 302, in first dictionary 300A. Similarly, second dictionary 300B maps label 320 to vector representation 330, which is illustrated as the top row of cells of various patterns, adjacent to label 320, in second dictionary 300B. Although first and second dictionaries 300A and 300B are depicted as being particular sizes (i.e., dimensions), this is merely illustrative, not by way of limitation. First and second dictionaries 300A and 300B may be of any suitable sizes. First dictionary 300A may provide mappings between any suitable number of n-grams and vector representations, and second dictionary 300B may provide mappings between any suitable number of labels and vector representations.

Each of the vector representations of n-grams, determined using first dictionary 300A, and each of the vector representations of labels, determined using second dictionary 300B, may provide coordinates for respective points in an embedding space. The embedding space may be a multi-dimensional space (e.g., d-dimensional) and may include a plurality of points corresponding to label embeddings. As used herein, a label embedding refers to a representation of a label in the embedding space based on the vector representation of the label (e.g., determined using dictionary 300B). Each label embedding may correspond to a respective point in the embedding space. In particular embodiments, the embedding space includes a plurality of points corresponding to text embeddings. As used herein, a text embedding refers to a representation of text in the embedding space based on the vector representation of the text (e.g., determined using dictionary 300A). Each text embedding may correspond to a respective point in the embedding space. As an example and not by way of limitation, text may be made up of constituent n-grams (e.g., a textual phrase "watching the Philadelphia Flyers"), and the text embedding may be determined based on vector representations of the constituent n-grams (e.g., a non-linear combination of the vector representations of "watching," "Philadelphia," and "Flyers"). Determining a text embedding based on a combination of constituent n-grams is described in further detail below in connection with FIG. 5.

First and second dictionaries 300A and 300B may be part of a deep-learning model. To generate optimal text and label embeddings, the deep-learning model may be trained. First and second dictionaries 300A and 300B may be generated during a training phase of the deep-learning model. The deep-learning model may be, for example, a convolutional neural network. First and second dictionaries 300A and 300B may be initialized using a random distribution. That is, first and second dictionaries 300A and 300B may initially have randomly-assigned mappings. As an example and not by way of limitation, the random distribution may be a Gaussian distribution. The training may result in first and second dictionaries 300A and 300B generating more optimal mappings than the initial mappings. Training of the deep-learning model is depicted and described in further detail in connection with FIG. 4.

Although this disclosure describes and illustrates particular embodiments of FIGS. 3A-3B as being implemented by social-networking system 160, this disclosure contemplates any suitable embodiments of FIGS. 3A-3B as being implemented by any suitable platform or system. As an example, and not by way of limitation, particular embodiments of FIGS. 3A-3B may be implemented by client system 130 or third-party system 170. Furthermore, although this disclosure describes and illustrates particular components, devices, or systems carrying out particular steps of the method of FIGS. 3A-3B, this disclosure contemplates any suitable combination of any suitable components, devices, or systems carrying out any suitable steps of the method of FIGS. 3A-3B.

Figure 4:
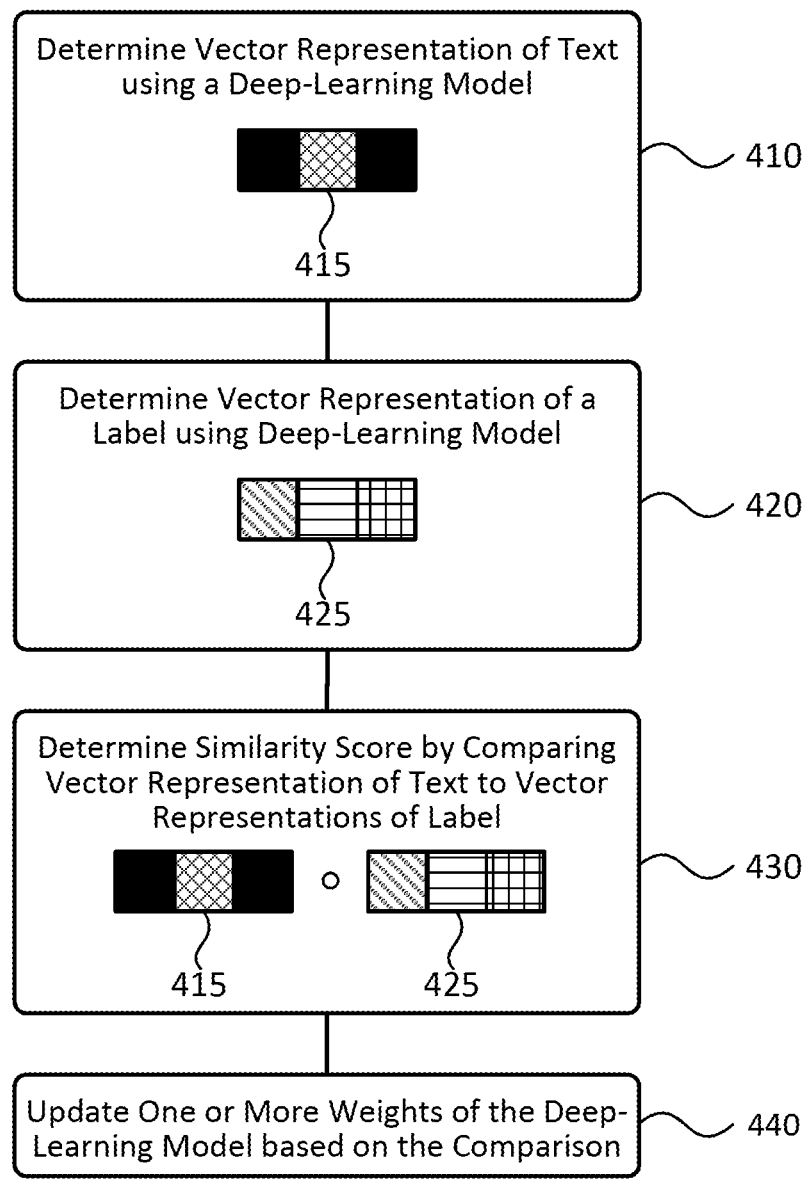
FIG. 4 illustrates an example method for training a deep-learning model.

FIG. 4 illustrates an example method 400 for training a deep-learning model. The deep-learning model may be trained in a supervised setting, and the supervised signal may be labels. The deep-learning model may be trained to minimize or reduce error between the vector representation of each text embedding and the vector representations of label embeddings of labels that are relevant to the respective text. In other words, a goal of the training of the deep-learning model may be to generate text embeddings that correspond to points in an embedding space that are proximate to points corresponding to label embeddings of relevant labels and far from points corresponding to label embeddings of irrelevant labels. Similarly, a goal of the training may be to generate label embeddings that correspond to points in an embedding space that are proximate to points corresponding to text embeddings of relevant text and far from points corresponding to text embeddings of irrelevant text. As an example and not by way of limitation, label embeddings of labels that are very relevant to particular text may correspond to points that are very close to the point corresponding to the text embedding of the particular text. Relevance, between text and labels, may be determined based on any suitable factors, including for example and not by way of limitation, based on a corpus of data including example usage of text and labels (e.g., text posts augmented with labels on an application associated with social-networking system 160 or a messaging platform).

At step 410, a vector representation 415 of text is determined using the deep-learning model. As an example and not by way of limitation, vector representation 415 of text may be determined using first dictionary 300A. At step 420, a vector representation 425 of a label is determined using the deep-learning model. As an example and not by way of limitation, vector representation 425 of the label may be determined using first dictionary 300A.

At step 430, a similarity score may be determined by comparing vector representation 415 of text to vector representation 425 of a label. Vector representation 415 of text may be compared to one or more vector representations of labels (e.g., vector representation 425 of a label), which may include positive examples of labels (i.e., labels known to be relevant to the text) and negative examples of labels (i.e., labels randomly selected). As an example and not by way of limitation, if the text is "Dance Moms," positives examples of labels may include "#ballet" and "#sorrynotsorry," whereas negative examples of labels may include "#niallhoran" and "#blizzard." In particular embodiments, a loss function may be used to train the deep-learning model. To learn the optimal weights (i.e., parameters) of the deep-learning model, social-networking system 160 may minimize a loss function (i.e., minimize error). In particular embodiments, the loss function may be given by:

$$E = k + sim(w, t^-) - sim(w, t^+) \quad (1)$$

where E denotes error, k denotes a margin of error constant, w denotes text, $t^-$ denotes a negative sample label, $t^+$ denotes a positive sample label, $sim(w, t^-)$ denotes a similarity score between the vector representations of text w and of negative sample label $t^-$, and $sim(w, t^+)$ denotes a similarity score between the vector representations of text w and of positive sample label $t^+$. Although FIG. 4 is depicted and described as comparing vector representation 415 of text to a single vector representation 425 of a label, it will be understood that this is for illustrative purposes and not by way of limitation. Rather, each vector representation 415 of text may be compared to any suitable number of vector representations of labels known to be relevant to the text (e.g., based on prior-use in a database of label-augmented text stored in social-networking system 160) and any suitable number of vector representations of labels randomly selected from a plurality of labels. In particular embodiments, a similarity score between vector representation 415 of text and vector representation 425 of a label may be determined based on an angle between the vector representations 415 and 425. In particular embodiments, a similarity score between vector representation 415 of text and vector representation 425 of a label may be determined by computing a dot product of vector representation 415 and vector representation 425. In particular embodiments, a similarity score may be determined based on Euclidean distance, cosine similarity, or any other suitable technique for computing a measure of pairwise relevance of points in an embedding space corresponding to vector representation 415 of text and vector representation 425 of a label.

At step 440, one or more weights of the deep-learning model may be updated based on the comparison from step 430. Initial values of the one or more weights of the deep-learning model may be randomly determined (e.g., using a Gaussian distribution). In particular embodiments, one or more of the weights of the deep-learning model may be updated to minimize error using similarity scores determined at step 430 between the vector representation of each text embedding (e.g., vector representation 415 of text) and vector representations of one or more label embeddings (e.g., vector representation 425 of a label). In particular embodiments, one or more weights of the deep-learning model may be updated to minimize error given by Eq. 1. The weights of the deep-learning model may be updated to yield better vector representations for text queries. This method described in steps 410-440 may be repeated, and a stochastic gradient descent function may be used to gradually refine the weights. Training the deep-learning model by updating the weights may improve the mappings of first and second dictionaries 300A and 300B.

Although this disclosure describes and illustrates particular embodiments of FIG. 4 as being implemented by social-networking system 160, this disclosure contemplates any suitable embodiments of FIG. 4 occurring on any suitable interface and as being implemented by any suitable platform or system. As an example, and not by way of limitation, particular embodiments of FIG. 4 may be implemented by client system 130 or third-party system 170. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Once the deep-learning model has been trained, text embeddings and label embeddings may be determined based on the vector representations determined using the deep-learning model. Each of the text embeddings and each of the label embeddings may correspond to a respective point in an embedding space.

Using a Deep-Learning Model to Determine Embeddings in an Embedding Space

Figure 5:
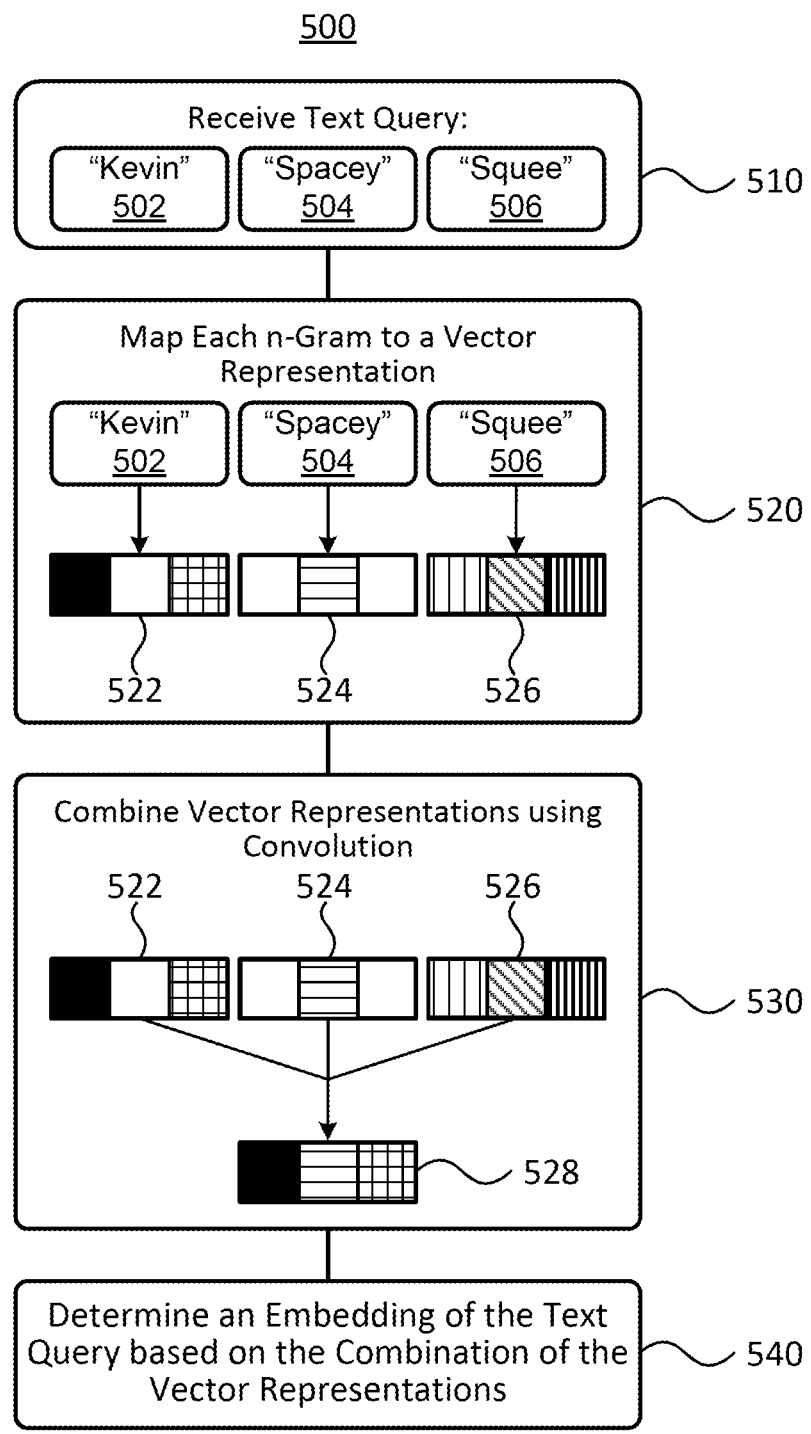
FIG. 5 illustrates an example method for determining an embedding of a text query using a deep-learning model.

FIG. 5 illustrates an example method 500 for determining an embedding of a text query using a deep-learning model. At step 510, a text query may be received (e.g., inputted by a user at an interface of client system 130). The text query may be received at social-networking system 160. As an example and not by way of limitation, a text query may be a post published by a user to social-networking system 160. As another example and not by way of limitation, a text query may be a message inputted at an interface of a messaging platform. The text query may include any suitable number of n-grams. In the illustrated example of FIG. 5, the text query includes three n-grams 502, 504, and 506: "Kevin Spacey Squee."

At step 520, social-networking system 160 may map the text query (e.g., "Kevin Spacey Squee") to three vector representations (e.g., one for each word), using, for example, dictionary 300A, which is generated using the deep-learning model. Each n-gram 502, 504, and 506 may be mapped to a respective vector representation 522, 524, and 526, as described above in connection with FIG. 3A. In particular embodiments, certain words of a text query (e.g., pronouns, prepositions, conjunctions, or any other words not significantly contributing to the meaning of the text query) may be disregarded at step 510.

At step 530, vector representations 522, 524, and 526 may be combined. Any suitable technique may be used to combine vector representations 522, 524, and 526 into a single vector representation 528, including, as an example and not by way of limitation, convolution, averaging, any other suitable non-linear combination technique, any other suitable technique, or any combination thereof. In the illustrated example of FIG. 5, social-networking system 160 performs a convolution of the three vectors 522, 524, and 526 (e.g., a 3-tap convolution) and then a max pooling operation to yield one vector representation 528 of the text query.

At step 540, an embedding of the text query may be determined based on the combination of the vector representations. In particular embodiments, social-networking system 160 may determine an embedding of the text query based on the vector representation 528. As used herein, an embedding of a text query may refer to a representation of the text query in an embedding space based on the combined vector representation 528 of the text query. Coordinates for a point in an embedding space may be determined based on vector representation 528 of the text query. In particular embodiments, the deep-learning model may be used to generate a plurality of text embeddings and a plurality of label embeddings. Each of these text embeddings and label embeddings may be based on a respective vector representation that corresponds to a particular point in an embedding space. An example embedding space is depicted in and described in connection with FIG. 6.

Although this disclosure describes and illustrates particular embodiments of FIG. 5 as being implemented by social-networking system 160, this disclosure contemplates any suitable embodiments of FIG. 5 occurring on any suitable interface and as being implemented by any suitable platform or system. As an example, and not by way of limitation, particular embodiments of FIG. 5 may be implemented by client system 130 or third-party system 170. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
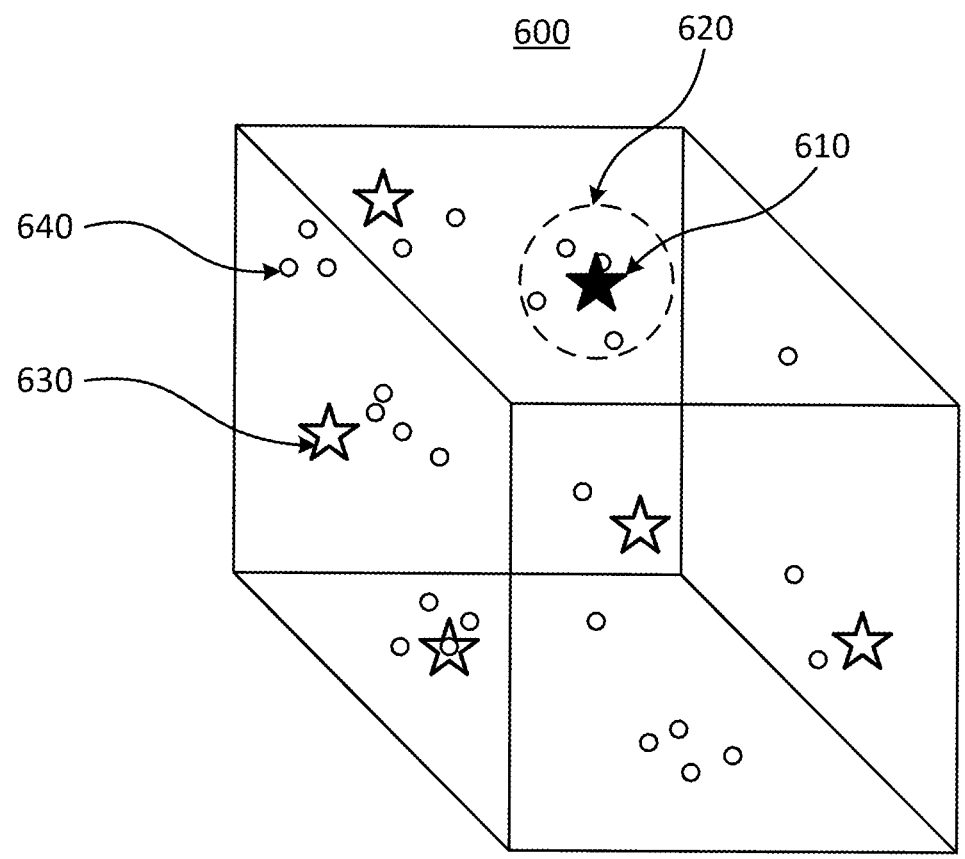
FIG. 6 illustrates an example view of an embedding space.

FIG. 6 illustrates an example view of an embedding space 600. Embedding space 600 includes a point corresponding to an embedding of a text query 610 and a plurality of points corresponding to a plurality of label embeddings 640. Embedding space 600 may additionally include a plurality of points corresponding to a plurality of text embeddings 630. A plurality of label embeddings may be determined based on the vector representations of labels determined using the deep-learning model (e.g., after it has been trained as described in connection with FIG. 4), and the label embeddings may be represented in embedding space 600 as points 640. Similarly, a plurality of text embeddings may be determined based on the vector representations of text determined using the deep-learning model, and the text embeddings may be represented in embedding space 600 as points 630. The point corresponding to the embedding of text query 610 may be, as an example and not by way of limitation, the embedding of the text query determined in step 540 of FIG. 5. Although embedding space 600 is illustrated as being a three-dimensional space, it will be understood that this is for illustrative purposes only, and embedding space 600 may be of any suitable dimension. As an example and not by way of limitation, embedding space 600 may be d-dimensional, and the vector representations on which the embeddings are based (e.g., text embeddings, label embeddings, and embedding of the text query) may be d-dimensional intensity vectors, where d denotes any suitable number of dimensions.

In particular embodiments, embedding space 600 may be used to predict labels (e.g., hashtags) that are relevant to a particular text query (e.g., "Kevin Spacey Squee"). In particular embodiments, social-networking system 160 may identify one or more points corresponding to label embeddings 640 of labels that are relevant to a text query using a search algorithm. The search algorithm may be applied to embedding space 600 to identify points 640 corresponding to label embeddings that are within a threshold distance of point 610 corresponding to the embedding of the text query. Each of these label embeddings may be associated with a respective label that may be identified as relevant to the text query. In the illustrated example of FIG. 6, the threshold distance is depicted as an area 620 in embedding space 600. As an example and not by way of limitation, point 610 may be a point corresponding to the embedding of "Kevin Spacey Squee," and the points identified as being within area 620 of point 610 may include points 640 corresponding to embeddings of hashtags "#MCM," "#houseofcards," "ffrankunderwood," and "#netflix." As another example and not by way of limitation, point 610 may be a point corresponding to the embedding of "Went running today—my feet hurt so much!" and the points identified as being within area 620 of point 610 may include points 640 corresponding to embeddings of hashtags "#running," "#ouch," "#nopainnogain," "#nike," "#marathontraining," and "#outofshape."

In particular embodiments, social-networking system 160 may use any suitable technique for identifying one or more label embeddings that are relevant to a text query. As an example and not by way of limitation, social-networking system 160 may use locality-sensitive hashing, hierarchical clustering techniques, ball tree techniques, binary search tree techniques, a space-partitioning data structure for organizing points in a k-dimensional space (e.g., a k-dimensional tree), quantization, any other suitable search algorithm or technique, or any combination thereof.

In particular embodiments, social-networking system 160 may send the one or more labels identified as being relevant to the text query to a user's client system 130 for display to the user. As an example and not by way of limitation, the user may enter the text query via an interface of an application running on the user's client system 130 (e.g., an application associated with social-networking system 160 or a messaging platform), and social-networking system 160 may provide the identified labels as suggestions to the user in the application. The identified labels may be selectable in the application so as to augment the user's text query in real time. Social-networking system 160 may dynamically process the text query as it is entered or received and may generate suggested labels based on the text query that has been inputted (for example, using a typeahead-like functionality, as described in U.S. patent application Ser. No. 12/763,171, filed 19 Apr. 2010, issued as U.S. Pat. No. 8,244,848 on 14 Aug. 2012, which is incorporated by reference herein). In particular embodiments, social-networking system 160 may generate suggested labels based on a prediction as to what root word, or derivative thereof, a partial text query corresponds.

In particular embodiments, social-networking system 160 may use embedding space 600 to predict objects (e.g., documents or pages) with which a user will positively interact. As an example and not by way of limitation, social-networking system 160 may determine an affinity between a user and content associated with a text query authored by the user. Social-networking system 160 may determine an embedding of the text query (e.g., point 610) in embedding space 600. The text query may indicate a positive affinity for the content of the text query (e.g., "Taylor Swift killed it last night"). Social-networking system 160 may then apply a search algorithm to identify one or more text embeddings within a predetermined distance of the embedding of the text query (e.g., point 610). The social-networking system 160 may then identify objects (e.g., a page associated with a fan club for Taylor Swift) associated with these identified text embeddings to predict an object with which the user may positively interact (e.g., like, click on, or otherwise interact with on social-networking system 160).

Although this disclosure describes and illustrates particular embodiments of FIG. 6 as being implemented by social-networking system 160, this disclosure contemplates any suitable embodiments of FIG. 6 occurring on any suitable interface and as being implemented by any suitable platform or system. As an example, and not by way of limitation, particular embodiments of FIG. 6 may be implemented by client system 130 or third-party system 170. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
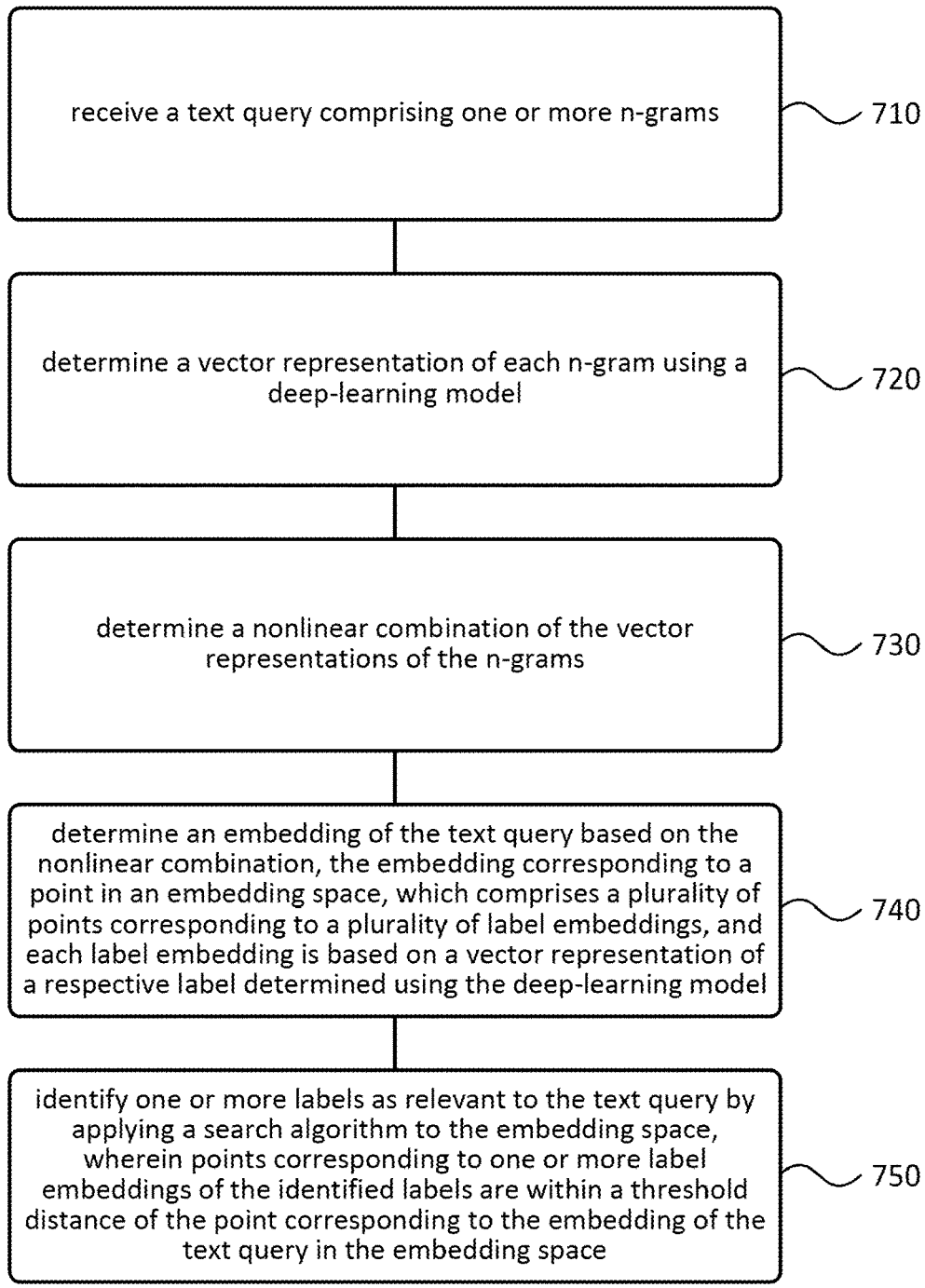
FIG. 7 illustrates an example method for identifying labels that are relevant to a text query.

FIG. 7 illustrates an example method 700 for identifying labels that are relevant to a text query. The method may begin at step 710, where social-networking system 160 may receive a text query comprising one or more n-grams. At step 720, social-networking system 160 may determine a vector representation of each n-gram using a deep-learning model. At step 730, social-networking system 160 may determine a nonlinear combination of the vector representations of the n-grams, where the embedding of the text query corresponds to a point in an embedding space, the embedding space comprises a plurality of points corresponding to a plurality of label embeddings, and each label embedding is based on a vector representation of a respective label determined using the deep-learning model. At step 740, social-networking system 160 may identify one or more labels as relevant to the text query by applying a search algorithm to the embedding space, where points corresponding to one or more label embeddings of the identified labels are within a threshold distance of the point corresponding to the embedding of the text query in the embedding space.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for identifying labels that are relevant to a text query including the particular steps of the method of FIG. 7, this disclosure contemplates any suitable method for identifying labels that are relevant to a text query including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 8:
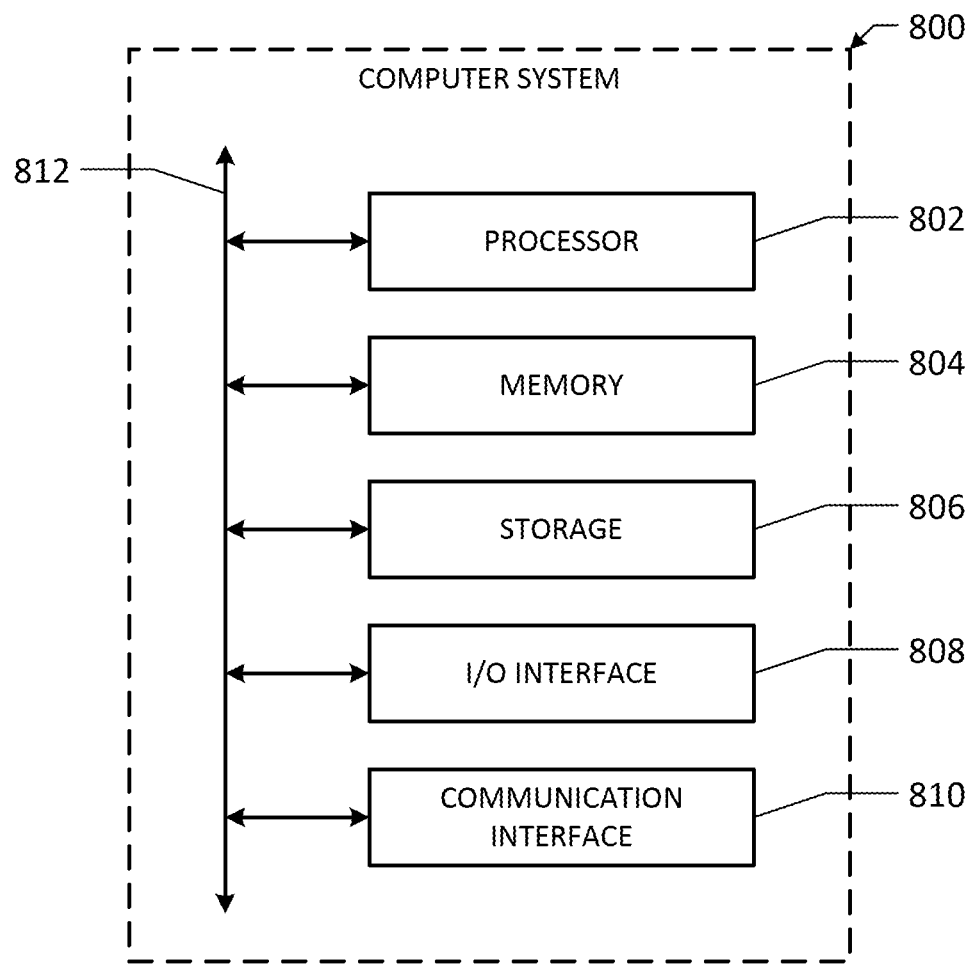
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising, by one or more computing devices:
    receiving, by one or more of the computing devices from a client system of a first user, a text query input by the first user at a user interface of the client system and comprising one or more n-grams;
    determining, by one or more of the computing devices, a vector representation of each n-gram using a deep-learning model;
    determining, by one or more of the computing devices, a nonlinear combination of the vector representations of the n-grams;
    determining, by one or more of the computing devices, an embedding of the text query based on the nonlinear combination of the vector representations of the n-grams, wherein:
        the embedding of the text query corresponds to a point in an embedding space,
        the embedding space comprises a plurality of points corresponding to a plurality of label embeddings and a plurality of text embeddings, respectively,
        each label embedding is based on a vector representation of a respective label determined using the deep-learning model, and
        each text embedding is based on a vector representation of a respective text determined using the deep-learning model;
    identifying, by one or more of the computing devices, one or more labels as relevant to the text query by applying a search algorithm to the embedding space using the deep-learning model, wherein points corresponding to one or more label embeddings of the identified labels are within a threshold distance of the point corresponding to the embedding of the text query in the embedding space, and wherein the deep-learning model has been trained to map text and labels to respective vector representations; and
    sending, by one or more of the computing device to the client system of the first user, instruction for presenting a search-results interface comprising one or more suggested labels from the identified labels.

2. The method of claim 1, wherein the deep-learning model comprises:
    a first dictionary that maps text to respective vector representations; and
    a second dictionary that maps labels to respective vector representations.

3. The method of claim 2, wherein the first dictionary and the second dictionary are initialized using a random distribution.

4. The method of claim 3, wherein the random distribution is a Gaussian distribution.

5. The method of claim 1, wherein the deep-learning model is trained to reduce error between the vector representation of each text embedding and the vector representations of label embeddings of labels that are relevant to the respective text.

6. The method of claim 5, wherein the deep-learning model is trained to minimize error using similarity scores determined between each text embedding and one or more label embeddings.

7. The method of claim 6, wherein each similarity score is computed based on one or more angles between a vector representation of text associated with a text embedding and one or more vector representations of one or more labels associated with one or more label embeddings.

8. The method of claim 6, wherein the deep-learning model is further trained using a gradient descent technique.

9. The method of claim 1, wherein at least one of the labels comprises a hashtag.

10. The method of claim 1, wherein at least one of the labels comprises an ideogram.

11. The method of claim 1, further comprising sending, to the client system of the user, the one or more identified labels for display to the user.

12. The method of claim 1, wherein the vector representations comprise d-dimensional intensity vectors.

13. The method of claim 1, wherein the nonlinear combination of vector representations comprises a convolution.

14. The method of claim 1, wherein the deep-learning model is a convolutional neural network.

15. One or more computer-readable non-transitory storage media embodying software that is operable when executed to:
    receive, from a client system of a first user, a text query comprising input by the first user at a user interface of the client system and one or more n-grams;
    determine a vector representation of each n-gram using a deep-learning model;
    determine a nonlinear combination of the vector representations of the n-grams;
    determine an embedding of the text query based on the nonlinear combination of the vector representations of the n-grams, wherein:
        the embedding of the text query corresponds to a point in an embedding space, the embedding space comprises a plurality of points corresponding to a plurality of label embeddings and a plurality of text embeddings, respectively, each label embedding is based on a vector representation of a respective label determined using the deep-learning model, and each text embedding is based on a vector representation of a respective text determined using the deep-learning model;

identify one or more labels as relevant to the text query by applying a search algorithm to the embedding space using the deep-learning model, wherein points corresponding to one or more label embeddings of the identified labels are within a threshold distance of the point corresponding to the embedding of the text query in the embedding space, and wherein the deep-learning model has been trained to map text and labels to respective vector representations; and sending, by one or more of the computing device to the client system of the first user, instruction for presenting a search-results interface comprising one or more suggested labels from the identified labels.

16. The media of claim 15, wherein the deep-learning model comprises:
a first dictionary that maps text to respective vector representations; and
a second dictionary that maps labels to respective vector representations.

17. A system comprising: one or more processors; and a memory coupled to the processors comprising instructions executable by the processors, the processors operable when executing the instructions to:
receive, from a client system of a first user, a text query comprising input by the first user at a user interface of the client system and one or more n-grams;

determine a vector representation of each n-gram using a deep-learning model;

determine a nonlinear combination of the vector representations of the n-grams;

determine an embedding of the text query based on the nonlinear combination of the vector representations of the n-grams, wherein:

the embedding of the text query corresponds to a point in an embedding space, the embedding space comprises a plurality of points corresponding to a plurality of label embeddings and a plurality of text embeddings, respectively, each label embedding is based on a vector representation of a respective label determined using the deep-learning model, and each text embedding is based on a vector representation of a respective text determined using the deep-learning model;

identify one or more labels as relevant to the text query by applying a search algorithm to the embedding space using the deep-learning model, wherein points corresponding to one or more label embeddings of the identified labels are within a threshold distance of the point corresponding to the embedding of the text query in the embedding space, and wherein the deep-learning model has been trained to map text and labels to respective vector representations; and sending, by one or more of the computing device to the client system of the first user, instruction for presenting a search-results interface comprising one or more suggested labels from the identified labels.

* * * * *